(12) United States Patent
Aithal et al.

(10) Patent No.: US 10,991,059 B2
(45) Date of Patent: Apr. 27, 2021

(54) CREATING ACTION PLANS TO HANDLE LEGAL MATTERS BASED ON MODEL LEGAL MATTERS

(71) Applicant: International Business Machines Corporation, Armonk, NY (US)

(72) Inventors: Sharath Kumar Aithal, Bangalore (IN); Parthasarthi Komperla, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 15/877,011

(22) Filed: Jan. 22, 2018

(65) Prior Publication Data
US 2019/0228356 A1    Jul. 25, 2019

(51) Int. Cl.
*G06Q 50/18*    (2012.01)
*G06Q 10/06*    (2012.01)

(52) U.S. Cl.
CPC ......... *G06Q 50/18* (2013.01); *G06Q 10/0633* (2013.01)

(58) Field of Classification Search
CPC .. G06Q 50/18; G06Q 50/184; G06Q 10/0633; G06Q 10/1091; G06Q 10/06375; G06Q 10/06312
See application file for complete search history.

(56) References Cited

U.S. PATENT DOCUMENTS

| | | | |
|---|---|---|---|
| 7,945,600 B1 * | 5/2011 | Thomas | G06F 16/353 707/804 |
| 8,484,069 B2 | 7/2013 | Kisin et al. | |
| 9,547,660 B2 | 1/2017 | Mayer et al. | |
| 2005/0021429 A1 * | 1/2005 | Bates | G06Q 10/109 705/32 |
| 2005/0203814 A1 * | 9/2005 | Derry | G06Q 10/10 705/30 |
| 2009/0327049 A1 * | 12/2009 | Kisin | G06Q 10/06375 705/7.37 |

(Continued)

OTHER PUBLICATIONS

Maura R. Grossman & Gordon V. Cormack, Technology-Assisted Review in E-Discovery Can Be More Effective and More Efficient than Exhaustive Manual Review, 17 Rich. J.L. & Tech. 1 (2011). (Year: 2011).*

(Continued)

*Primary Examiner* — Carrie S Gilkey

(57) ABSTRACT

A method, system and computer program product for handling legal matters. Current and historical records associated with legal matters are analyzed. A model (hypothetical) legal matter is constructed based on such analysis. A notice based on the constructed model legal matter is created to be sent to custodians to collect and return data used in handling the model legal matter. The data collected by the custodians is then analyzed. Furthermore, the missing information from the data collected by the custodians as well as the data found and not found by the custodians from the identified missing information are analyzed. An action plan is created to handle the model legal matter based on these analyses. In this manner, by creating and utilizing such action plans, information to be collected for handling similar new legal matters will be most complete.

7 Claims, 7 Drawing Sheets

(56) References Cited

U.S. PATENT DOCUMENTS

| | | | | |
|---|---|---|---|---|
| 2010/0250474 A1* | 9/2010 | Richards | ............... | G06Q 10/06 706/12 |
| 2011/0040600 A1* | 2/2011 | Paknad | ................ | G06Q 50/18 705/7.42 |
| 2011/0040748 A1* | 2/2011 | Williams | ............... | G06Q 50/18 707/722 |
| 2013/0339258 A1* | 12/2013 | Kisin | .................... | G06Q 10/10 705/311 |
| 2014/0012623 A1* | 1/2014 | Paulmann | .......... | G06Q 30/0201 705/7.29 |
| 2015/0269693 A1* | 9/2015 | Geigel | ................ | G06Q 50/184 705/310 |
| 2016/0019282 A1 | 1/2016 | Lewis et al. | | |
| 2016/0171001 A1 | 6/2016 | Mayer et al. | | |
| 2019/0295199 A1* | 9/2019 | O'Dorisio | .............. | G06Q 50/18 |

OTHER PUBLICATIONS

List of IBM Patents or Patent Applications Treated as Related, Jun. 17, 2019, pp. 1-2.

Anonymously, "System, Method for Forecasting the Health of Legal Matter Proceeding," IP.com, IPCOM000240304D, Jan. 21, 2015, pp. 1-7.

Office Action for U.S. Appl. No. 16/442,321 dated Sep. 25, 2020, pp. 1-37.

\* cited by examiner

Attorney
123 Main Street
Anytown, US 12345

DISTRICT COURT OF _____

Case No.: 123456-123

Joe Smith, )
      Plaintiff, )
  vs. ) COMPLAINT
Manufacturer, )
      Defendant )

Plaintiff Joe Smith brings forth the following causes of action and alleges the following:

1. Plaintiff is an individual and resident of Anytown, USA.

2. Defendant is a corporation and at the time of this complaint, a resident of Anytown, USA.

3. On or about July 1, 2017, Plaintiff experienced dizziness from exhaust gas leaking into the cabin of Plaintiff's vehicle, Truck 101. The exhaust gas is believed to stem from carbon monoxide leaks.

4. On or about July 2, 2017, Plaintiff was taken to County Hospital to be treated for dizziness.

Plaintiff brings forth the following counts and allegation supporting his cause of action:

COUNT 1 - NEGLIGENCE

Defendant failed to manufacture a vehicle, Truck 101, with seals that effectively prevent exhaust gas from leaking into the cabin of the vehicle.

DAMAGES

WHEREFORE, Plaintiff seeks compensatory damages in the amount of $6,000 together with attorney fees and court costs.

Dated this 1st day of January, 2018

_____
Attorney

FIG. 4

ACTION PLAN

1. OBTAIN ELECTRONIC COMMUNICATIONS BETWEEN PRODUCT DEVELOPMENT GROUP AND LEGAL DEPARTMENT REGARDING EXHAUST GAS LEAKS IN VEHICLES

2. OBTAIN DRAWINGS OF EXHAUST SYSTEM OF TRUCK 101 FROM SERVER 101 UTILIZED BY PRODUCT DEVELOPMENT GROUP

3. OBTAIN DRAWINGS OF LIFT GATE SPACE OF TRUCK 101 FROM SERVER 101 UTILIZED BY PRODUCT DEVELOPMENT GROUP

FIG. 5

CREATING ACTION PLANS TO HANDLE LEGAL MATTERS BASED ON MODEL LEGAL MATTERS

TECHNICAL FIELD

The present invention relates generally to enterprise content management systems, and more particularly to creating action plans to handle legal matters based on model legal matters.

BACKGROUND

A content management system (CMS) (also known as an enterprise content management system (ECMS)) may be described as a software system used to store and organize unstructured content. This unstructured content includes (but is not limited to) documents, images, audio files, videos, reports, business records, and web content. The ECMS may be utilized in handling legal matters.

Legal governance refers to the establishment, execution and interpretation of processes and rules put in place by corporate legal departments in order to ensure a smoothly-run legal department and corporation. For example, when a lawsuit is filed against an enterprise, an individual, such as a legal professional, at the enterprise will create a legal matter in the enterprise legal system, such as an ECMS, and send out a notice or request to custodians (e.g., information technology department) to collect relevant information (e.g., tax records, saved electronic communications, blueprints, drawings) pertaining to the lawsuit.

There are times though that the information gathered by the information technology department is not complete. That is, there are times when the individual (e.g., legal professional) realizes that there is missing information from the information gathered by the custodians which may impact the legal proceeding in terms of lost time and legal costs. For example, if required information is missing (e.g., response to a subpoena), the individual (e.g., legal professional) or custodian will have to spend time in attempting to locate the missing information. The time spent in attempting to locate the missing information could be spent performing other tasks. Furthermore, the extra time spent in locating the missing information results in extra legal costs.

Unfortunately, there is not currently a software tool for ensuring that the information collected for a newly created legal matter is most complete thereby reducing the legal and time costs.

SUMMARY

In one embodiment of the present invention, a method for handling legal matters comprises analyzing a collection of current and historical records associated with legal matters. The method further comprises constructing a model legal matter based on the analysis of the collection of current and historical records associated with legal matters. The method additionally comprises creating a notice based on the constructed model legal matter to be sent to one or more custodians to collect and return data used in handling the model legal matter. Furthermore, the method comprises analyzing the data collected by the one or more custodians. Additionally, the method comprises analyzing missing information from the data collected by the one or more custodians identified by an individual. In addition, the method comprises analyzing data found and not found by the one or more custodians from the identified missing information. The method further comprises creating, by a processor, an action plan to handle the model legal matter based on the analysis of the data collected by the one or more custodians, the analysis of the missing information and the analysis of data found and not found from the identified missing information.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 4 illustrates an example of a model legal matter in accordance with an embodiment of the present invention;

FIG. 5 illustrates an example of an action plan specifying the strategy or course of action in handling the model legal matter illustrated in FIG. 4 in accordance with an embodiment of the present invention.

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses the present invention in connection with handling legal matters, the principles of the present invention may be applied to other situations involving a user and a custodian (e.g., Information Technology (IT) department), in which there is missing information from the data collected by the custodian requested by the user. A person of ordinary skill in the art would be capable of applying the principles of the present invention to such implementations. Further, embodiments applying the principles of the present invention to such implementations would fall within the scope of the present invention.

Figure 1:
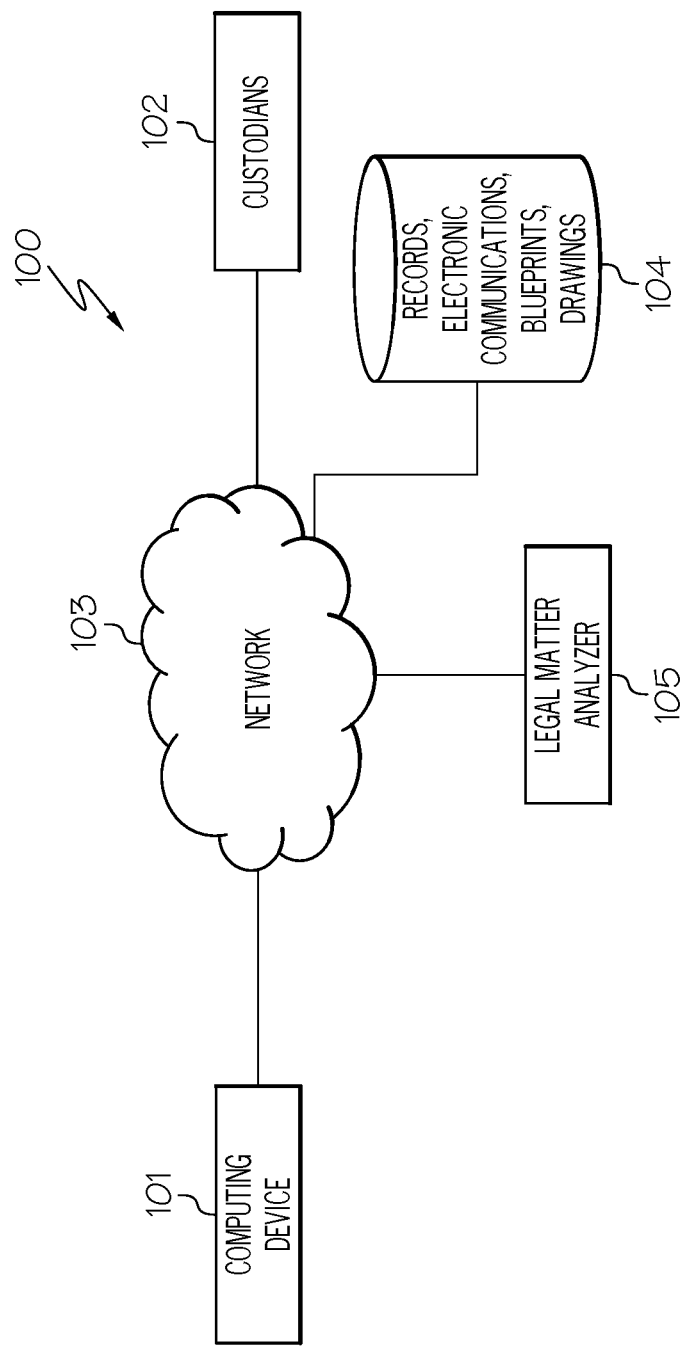
FIG. 1 illustrates a system configured in accordance with an embodiment of the present invention.

Referring now to the Figures in detail, FIG. 1 illustrates a system 100 configured in accordance with an embodiment of the present invention. In one embodiment, system 100 is utilized in an enterprise organization, such as a legal department. System 100 includes a computing device 101 (a computing device utilized by an individual, such as a legal professional) connected to custodians 102 (e.g., an Information Technology ("IT") department) via a network 103. A "legal professional," as used herein, includes attorneys, paralegals, administrative assistants, etc. that work in the legal profession. Furthermore, a "custodian," as used herein, includes any individuals or group of individuals that possess knowledge of the location of the information (e.g., records, electronic communications, blueprints, drawings, etc.) pertaining to legal matters or has actual possession of the information pertaining to legal matters. Non-limiting examples of custodians include attorneys, paralegals, employees and the IT department. The IT department refers to the department within the enterprise that is charged with establishing, monitoring and maintaining information technology systems and services, such as legal systems and services. For instance, the IT department may be responsible for establishing, monitoring and maintaining information pertaining to legal matters, such as records, electronic communications, blueprints, drawings, etc. In one embodiment, the information pertaining to legal matters is stored in a database 104 connected to network 103.

Custodians 102, as used herein, refer to the computing devices utilized by the custodians. The computing device (e.g., computing device 101) utilized by an individual, such as a legal professional, or the computing devices utilized by the custodians may include a portable computing unit, a Personal Digital Assistant (PDA), a smartphone, a laptop computer, a mobile phone, a navigation device, a game console, a desktop computer system, a workstation, an Internet appliance and the like configured with the capability of connecting to network 103 and consequently communicating with custodians 102/computing device 101 as discussed below.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a mechanism, referred to herein as the "legal matter analyzer" 105, configured to construct model legal matters based on analyzing current and historical records associated with legal matters, where information regarding such legal matters may be stored in database 104. Furthermore, legal matter analyzer 105 is configured to create action plans to handle such model legal matters. Such action plans may be utilized by individuals, such as legal professionals, or custodians to handle real (non-model) legal matters, such as those legal matters that are similar to the model legal matters created by legal matter analyzer 105. These and other features will be discussed in greater detail below. A description of an embodiment of a hardware configuration of legal matter analyzer 105 is provided below in connection with FIG. 2. It is noted that while a general personal computer system is showed as an exemplary embodiment of legal matter analyzer 105 that legal matter analyzer 105 may consist of a collection of general purpose computing devices or may have its functionality embodied in an application specific integrated circuit.

System 100 is not to be limited in scope to any one particular network architecture. System 100 may include any number of computing devices 101, custodians 102, networks 103, databases 104 and legal matter analyzers 105.

Figure 2:
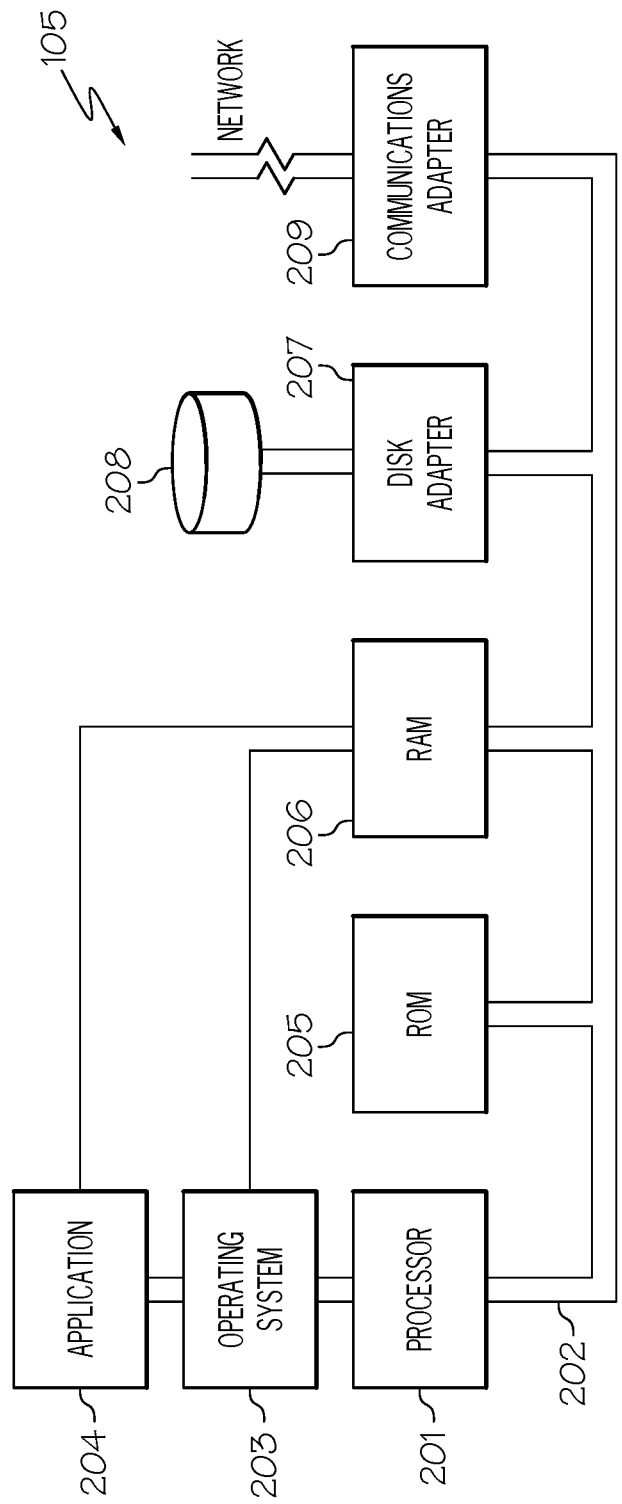
FIG. 2 illustrates an embodiment of the present invention of a hardware configuration of a legal matter analyzer which is representative of a hardware environment for practicing the present invention.

Referring now to FIG. 2, FIG. 2 illustrates an embodiment of the present invention of a hardware configuration of legal matter analyzer 105 (FIG. 1) which is representative of a hardware environment for practicing the present invention. Referring to FIG. 2, legal matter analyzer 105 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for handling legal matters by creating action plans based on model legal matters as discussed further below in connection with FIGS. 3A-3B and 4-6.

Referring again to FIG. 2, read-only memory ("ROM") 205 is coupled to system bus 202 and includes a basic input/output system ("BIOS") that controls certain basic functions of legal matter analyzer 105. Random access memory ("RAM") 206 and disk adapter 207 are also coupled to system bus 202. It should be noted that software components including operating system 203 and application 204 may be loaded into RAM 206, which may be legal matter analyzer's 105 main memory for execution. Disk adapter 207 may be an integrated drive electronics ("IDE") adapter that communicates with a disk unit 208, e.g., disk drive. It is noted that the program for handling legal matters by creating action plans based on model legal matters, as discussed further below in connection with FIGS. 3A-3B and 4-6, may reside in disk unit 208 or in application 204.

Legal matter analyzer 105 further includes a communications adapter 209 coupled to bus 202. Communications adapter 209 interconnects bus 202 with an outside network (e.g., network 103 of FIG. 1) thereby allowing legal matter analyzer 105 to communicate with other devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, there are times though that the information gathered by the information technology department is not complete. That is, there are times when the individual (e.g., legal professional) realizes that there is missing information from the information gathered by the custodians which may impact the legal proceeding in terms of lost time and legal costs. For example, if required information is missing (e.g., response to a subpoena), the individual (e.g., legal professional) or custodian will have to spend time in attempting to locate the missing information. The time spent in attempting to locate the missing information could be spent performing other tasks. Furthermore, the extra time spent in locating the missing information results in extra legal costs. Unfortunately, there is not currently a software tool for ensuring that the information collected for a newly created legal matter is most complete thereby reducing the legal and time costs.

Figure 3A:
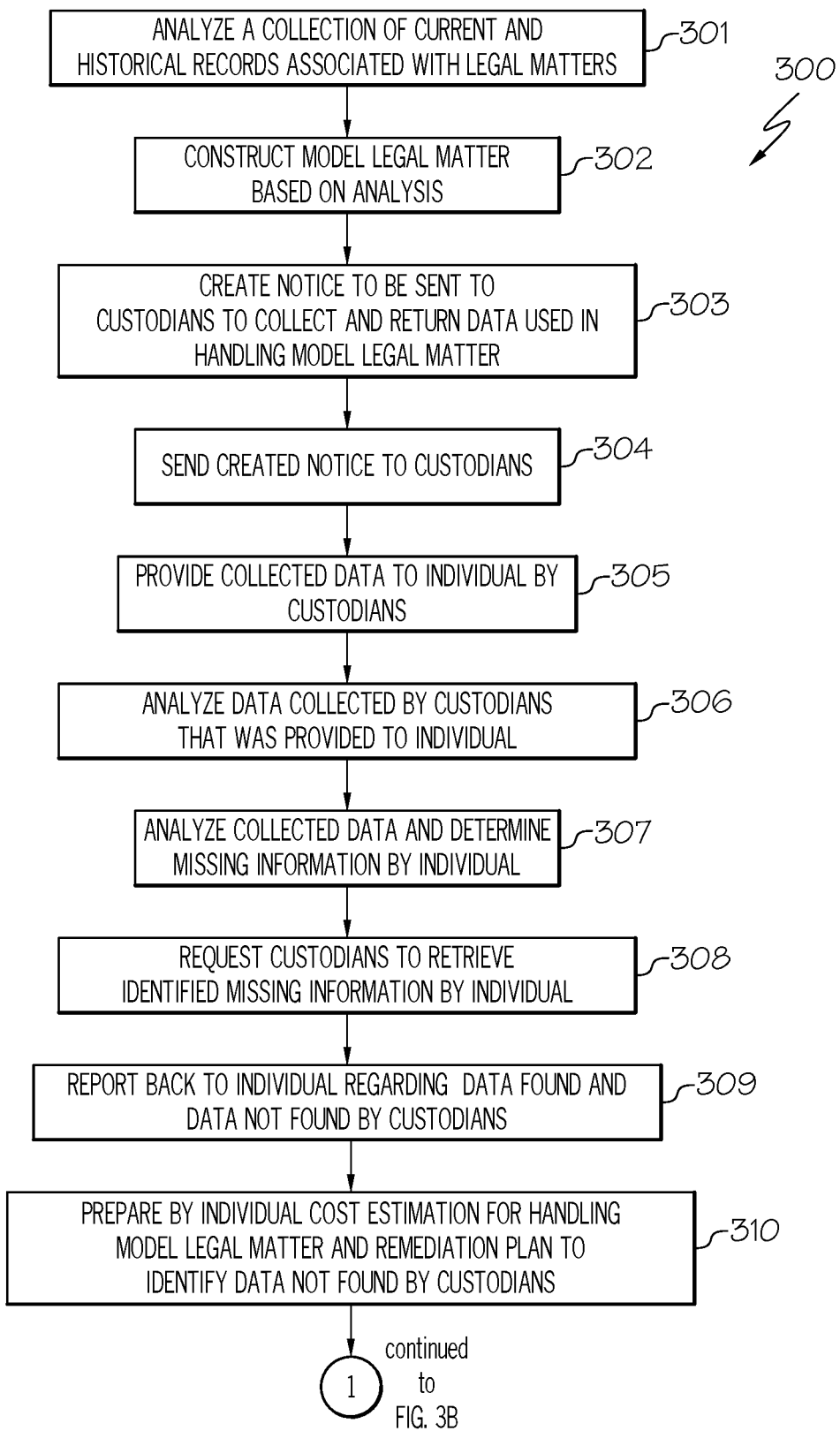
FIGS. 3A-3B are a flowchart of a method for creating action plans based on constructed model legal matters in accordance with an embodiment of the present invention.
Figure 3B:
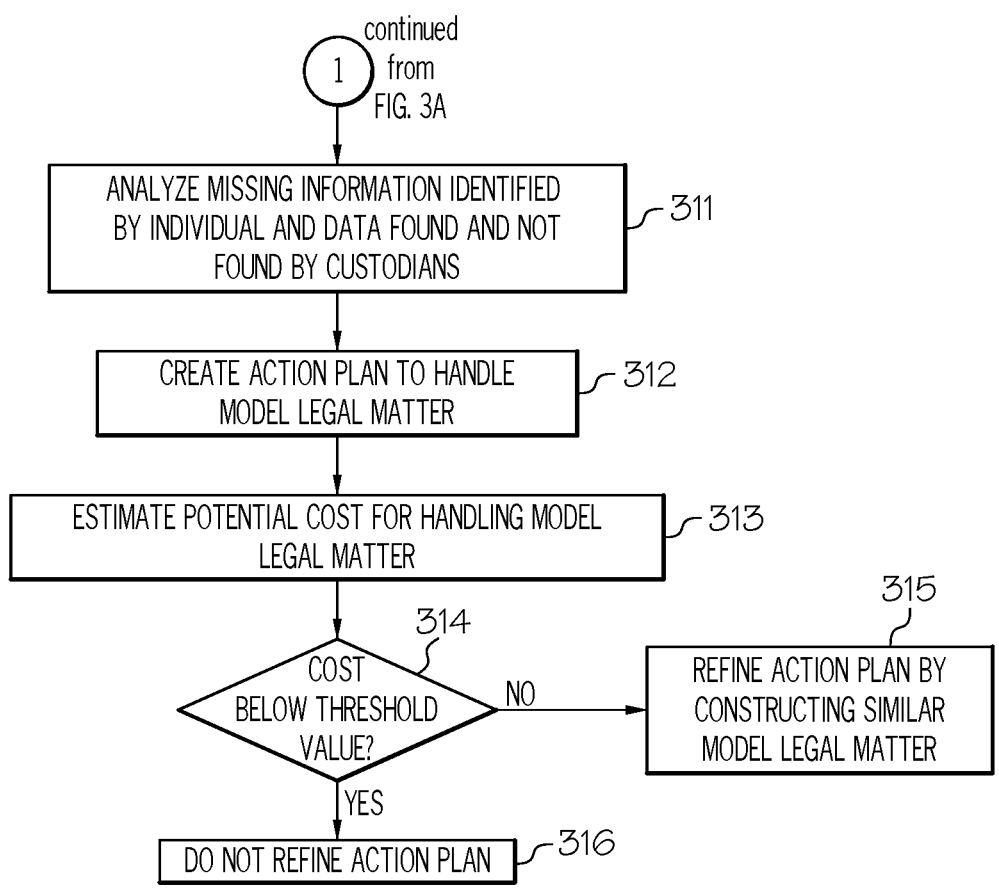
Figure 6:
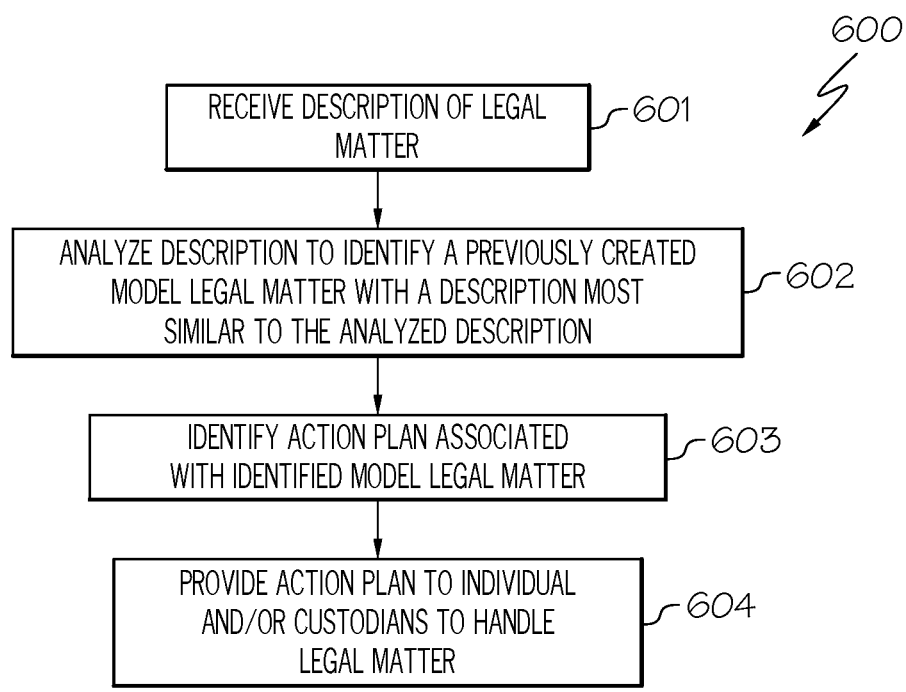
FIG. 6 is a flowchart of a method for handling legal matters based on the created action plans in accordance with an embodiment of the present invention.

The present invention provides a means for ensuring that the information collected for a newly created legal matter is most complete by creating action plans for handling legal matters. These action plans specify the information (e.g., records, electronic communications, blueprints, drawings) as well as the location of such information required to be collected in order to handle such legal matters. These action plans are based on model legal matters constructed by legal matter analyzer 105 as discussed below in connection with FIGS. 3A-3B and 4-6. FIGS. 3A-3B are a flowchart of a method for creating action plans based on constructed model legal matters. FIG. 4 illustrates an example of a model legal matter. FIG. 5 illustrates an example of an action plan specifying the strategy or course of action in handling the model legal matter illustrated in FIG. 4. FIG. 6 is a flowchart of a method for handling legal matters based on the created action plans.

As stated above, FIGS. 3A-3B are a flowchart of a method 300 for creating action plans based on constructed model legal matters in accordance with an embodiment of the present invention.

Referring to FIG. 3A, in conjunction with FIGS. 1-2, in step 301, legal matter analyzer 105 analyzes a collection of current and historical records associated with legal matters to extract concepts and keywords. In one embodiment, information (e.g., records, electronic communications, blueprints, drawings) pertaining to legal matters may be stored in a database, such as database 104. In one embodiment, legal matter analyzer 105 utilizes natural language processing to identify concepts and keywords in such information. Keywords, as used herein, refer to a word or words that are used to describe aspects of the legal matter. Concepts, as used herein, refer to the general notion of the legal matter, such as opinions, ideas, etc. In one embodiment, such keywords and concepts are derived from the analyzed records pertaining to the current and historical legal matters. For example, keywords in the analyzed records, such as "defect" and "exhaust system," may be identified in connection with a legal matter pertaining to exhaust gas concerns on a vehicle manufactured by an automobile company. Furthermore, concepts may be identified using natural language processing based on a group of words. For example, the phrase "We know that some of our customers do have some exhaust concerns" identified in an electronic communication may be interpreted by legal matter analyzer 105 as being directed to the concept of exhaust gas concerns.

In one embodiment, some of the tasks performed by legal matter analyzer 105 using natural language processing include tokenization (splitting text into words and terms), tagging various parts of speech, creating parse trees, syntactic analysis and semantic analysis. As used herein, syntactic analysis involves determining what words are included in a text selection; while, semantic analysis involves knowing what the collection of words actually means. After determining the meaning of the words, legal matter analyzer 105 extracts keywords and concepts from the analyzed records (e.g., complaints served to the enterprise).

In one embodiment, legal matter analyzer 105 further extracts from the analyzed records the necessary information to construct a model (a hypothetical) legal matter using the metadata in these records. In one embodiment, the metadata in these records includes the types of records, such as complaints, drawings, etc., as well as important legal information, such as the names of the parties, claims, remedies sought, etc., in these records. Such information will be used by legal matter analyzer 105 to construct a model (a hypothetical) legal matter as discussed below.

In step 302, legal matter analyzer 105 constructs a model legal matter (hypothetical legal matter) based on the analysis of the current and historical records using the extracted concepts and keywords in step 301. For example, legal matter analyzer 105 may construct the model legal matter of carbon monoxide concerns (extracted concept). Such a constructed legal matter may be similar in nature to the previously handled legal matters. For example, a constructed legal matter pertaining to carbon monoxide concerns may be based on previously handled legal matters pertaining to exhaust gas concerns. In one embodiment, legal matter analyzer 105 may utilize natural language processing for identifying similar but different concepts. For example, legal matter analyzer 105 may identify the concept of exhaust gas concerns from the analyzed current and historical legal matters. Since exhaust gas includes various components, such as hydrocarbons, nitrogen oxides and carbon monoxide, it may be deduced by legal matter analyzer 105 to construct a model legal matter pertaining to carbon monoxide concerns.

Furthermore, in one embodiment, legal matter analyzer 105 constructs the model legal matter based on the extracted information from the analyzed records using the metadata in these records. For example, legal matter analyzer 105 may construct a legal document, such as a complaint, with similar types of parties, claims and remedies, as in the analyzed complaint. For instance, an analyzed complaint may involve a lawsuit against an automobile company involving the claim (allegation) that the automobile company rigged their diesel pickup trucks to beat emission tests. Legal matter analyzer 105 may then construct a model legal matter that consists of a complaint involving a lawsuit against the automobile company involving the claim (allegation) that the automobile company rigged vehicles with gasoline engines to beat emission tests. An example of a model legal matter is shown in FIG. 4 involving a complaint against a corporation for manufacturing a vehicle with carbon monoxide leaks.

As shown in FIG. 4, a model legal matter is created based on exhaust gas leaks. Such a model legal matter will be used by legal matter analyzer 105 to create a notice requesting data (e.g., drawings of the exhaust system of Truck 101, drawings of the engine utilized by Truck 101) from the custodians as discussed below. Such data collected by the custodians will be provided to an individual, such as a legal professional, who will then determine if there is any missing information from the collected data that needs to be obtained in order to handle the legal matter, such as drawings from the lift gate space. Such missing information will then be requested from the custodians as discussed further below. The custodians will then report back to the individual (e.g., legal professional) regarding the data found, if any, and not found, if any, pertaining to locating the missing information. The data collected by the custodians, the missing information identified by the individual (e.g., legal professional), the data found and not found by the custodians in attempting to acquire the missing information will all be analyzed by legal matter analyzer 105, which will be used to create an action plan to handle the model legal matter as discussed further below. The action plan is a strategy or course of action in handling the model legal matter.

In one embodiment, the keywords and concepts of the constructed model legal matter, which may be identified in the manner discussed in step 301, are stored in database 104. Such keywords and concepts are associated with the constructed model legal matter as well as associated with the created action plan as discussed further below.

In step 303, legal matter analyzer 105 creates a notice based on the constructed model legal matter to be sent to the custodians to collect and return data ("data," as used herein, may be used interchangeably with "information") used in handling the model legal matter. For example, such a notice may include a request to collect the electronic communications, records, drawings, etc. pertaining to carbon monoxide concerns (the model legal matter), and to return such collected data to an individual, such as a legal professional. In one embodiment, the requested data is determined based on prior requests to custodians for collecting data pertaining to similar model legal matters. Furthermore, in one embodiment, legal matter analyzer 105 utilizes natural language processing to identify the keywords or phrases in the model legal matter which may be associated with various documents required to be collected. For example, the keyword or phrase of "exhaust system" may be associated with the drawings of the exhaust system. Such a mapping may be previously determined by an individual, such an engineer. In one embodiment, such a mapping (data structure) is stored in database 104.

In step 304, legal matter analyzer 105 sends the created notice to custodians 102.

In step 305, the custodians, after spending time gathering the requested data pertaining to the model legal matter, provide the collected data to computing device 101 (e.g., computing device utilized by an individual, such as a legal professional).

In step 306, legal matter analyzer 105 analyzes the data collected by the custodians that was provided to computing device 101. For example, legal matter analyzer 105 identifies the types of data collected (e.g., electronic communications), the quantity of such data (e.g., two hundred and twenty-two e-mails), the source of such data (e.g., electronic communications exchanged between the product development group and the legal department), etc.

In step 307, the individual, such as a legal professional, analyzes the collected data and determines the missing information. For example, the attorney may identify information pertaining to the drawings of the exhaust system as well as the lift gate space showing the location of the rear lift gate gaskets as being missing.

In step 308, the individual, such as a legal professional, requests the custodians to retrieve the identified missing information, such as via an electronic request sent by computing device 101.

In step 309, the custodians report back to the individual, such as a legal professional, regarding the data found, if any, and data not found, pertaining to locating the missing information identified by the individual.

In step 310, the individual, such as a legal professional, prepares a cost estimation for handling the model legal matter and a remediation plan to identify data not found by the custodians, if any. For example, the cost estimation may be based on the estimated hours spent by the attorney (or attorneys) and the IT department in collecting the relevant data (e.g., legal evidence), including the missing information, to handle the model legal matter. Furthermore, the attorney may devise a remediation plan to identify the data not found by the IT department. For example, if the missing information pertained to communications between the product development group and the product evaluation group, then the remediation plan may include the requirement that all communications between the product development group and the product evaluation group be saved for a period of time not less than three years.

Referring now to FIG. 3B, in conjunction with FIGS. 1-2, in step 311, legal matter analyzer 105 analyzes the missing information identified by the individual, such as a legal professional, as well as analyzes the data found, if any, and not found, if any, found by the custodians from the identified missing information. For example, legal matter analyzer 105 identifies the types of information that was missing (e.g., drawings), the quantity of such data (e.g., drawings produced by product development group), the source of such data (e.g., server utilized by product development group), etc. Legal matter analyzer 105 may further identify which of the missing information was found and not found. For such missing information not found, legal matter analyzer 105 may determine where such information may be found in the future or how such information may be found in the future, such as based on the attorney's remediation plan. For example, the attorney's remediation plan may indicate a requirement that all communications between the product development group and the product evaluation group be saved for a period of time not less than three years. Legal matter analyzer 105 may identify such a requirement by using natural language processing in its analysis of the attorney's remediation plan.

In step 312, legal matter analyzer 105 creates an action plan to handle the model legal matter. An "action plan," as used herein, refers to a strategy or course of action in handling the model legal matter, such as specifying the information (e.g., electronic communications exchanged between the product development group and the legal department, drawings of the exhaust system as well as the lift gate space) required to be collected, including their location (e.g., information located on a server utilized by the product development group) as well as new guidelines to be followed, such as preserving electronic communications between the product development group and the product evaluation group. In one embodiment, the action plan consists of a set of variables that are stored in a profile. In this manner, by creating and utilizing such action plans, information to be collected for handling similar new legal matters (discussed further below) will be most complete. An example of an action plan is shown in FIG. 5 specifying the strategy or course of action in handling the model legal matter illustrated in FIG. 4.

In one embodiment, the action plan is created by legal matter analyzer 105 based on the analyses previously performed by legal matter analyzer 105 discussed above (e.g., steps 306, 307 and 311). Legal matter analyzer 105 creates an action plan that attempts to ensure that all of the required information is collected to handle the model legal matter so that information to be collected for handling similar new legal matters (non-hypothetical or non-model legal matters) will be most complete. By collecting all (or nearly all) of the relevant data to handle a legal matter (non-hypothetical or non-model legal matter), costs are reduced by reducing the amount of time spent in identifying and locating the required missing information to handle the legal matter.

In one embodiment, the created action plans are stored in database 104. In one embodiment, such action plans are associated with the model legal matters they are designed to handle. In one embodiment, the action plans are additionally associated with the keywords and concepts of the associated model legal matters.

In step 313, legal matter analyzer 105 (in addition to the individual as discussed above in connection with step 310) estimates the potential cost in handling the potential model legal matter, such as based on the time spent in gathering the information, including the identified missing information, by the custodians. In one embodiment, legal matter analyzer 105 keeps track of the amount of time spent by the custodians in connection with the process discussed above. Additionally, the cost estimation may be based, at least in part, on the time spent by the legal professional in identifying the missing information. In one embodiment, legal matter analyzer 105 keeps track of the amount of time spent by the legal professional in connection with the process discussed above. By keeping track of such times, a cost may be assessed by multiplying an appropriate hourly rate to such times. For instance, the attorney and IT specialists in the IT department may be assigned an hourly rate, such as from their employer (e.g., an enterprise), which may be used to determine a cost for handling the model legal matter.

Furthermore, in one embodiment, the cost estimation may be based, at least in part, on implementing the remediation plan prepared by the individual, such as the legal professional. As discussed above, the legal professional may devise a remediation plan to identify the data not found by the custodians. For example, if the missing information pertained to communications between the product development group and the product evaluation group, then the remediation plan may include the requirement that all communications between the product development group and the product evaluation group be saved for a period of time not less than three years. Legal matter analyzer 105 may estimate the costs in storing electronic communications between such groups for a period of three years. Such an estimate may be based on the cost of storage devices and the cost of maintaining such storage devices.

In step 314, a determination is made by legal matter analyzer 105 as to whether the estimated potential cost is below a threshold value, which may be user-selected.

If the estimated potential cost is not below a threshold value, then, in step 315, legal matter analyzer 105 refines the action plan using the process discussed above. The created action plan may continue to be refined using the processed discussed above until the potential legal cost is below the threshold value. For example, legal matter analyzer 105 may construct a similar model legal matter. In one embodiment, such a similar model legal matter may be constructed after the remediation plan is implemented. After constructing a similar model legal matter, the action plan discussed above may be refined, such as by specifying different information to be collected, including their location, as well as possibly updating new guidelines to be followed.

If, however, the estimated potential cost is below a threshold value, then, in step 316, the action plan to handle the model legal matter is not refined. Such an action plan specifies the most complete information (e.g., electronic communications) to be collected, including their locations, as well as any guidelines to be followed at the lowest cost (e.g., legal cost).

After creating action plans to handle model legal matters, such action plans may be used to handle real (non-model) legal matters as discussed below in connection with FIG. 6.

FIG. 6 is a flowchart of a method 600 for handling legal matters based on the created action plans in accordance with an embodiment of the present invention.

Referring to FIG. 6, in conjunction with FIGS. 1-2, 3A-3B and 4-5, in step 601, legal matter analyzer 105 receives the description of a legal matter (non-hypothetical legal matter).

In step 602, legal matter analyzer 105 analyzes the description to identify a previously created model legal matter with a description most similar to the analyzed description. In one embodiment, legal matter analyzer 105 uses natural language processing to identify keywords and concepts (such as discussed above) in the analyzed description and compares such identified keywords and concepts to the keywords and concepts of previously created model legal matters. In one embodiment, such keywords and concepts of previously created model legal matters are stored in database 104. A description of the legal matter (non-hypothetical or non-model legal matter) is said to be most similar with a model legal matter where the description of the model legal matter contains a matching number of keywords and concepts (and similar keywords and concepts) that exceeds a user-designated threshold number or percentage (such as a percentage of the total number of keywords and concepts identified in the description of the legal matter/model legal matter). "Matching," as used herein, refers to identifying the same or similar keywords or concepts using natural language processing as well as identifying keywords and concepts with the same or similar derived meaning using natural language processing.

In step 603, legal matter analyzer 105 identifies the action plan associated with the identified model legal matter. As discussed above, the previously created model legal matters are associated with action plans.

In step 604, legal matter analyzer 105 provides the identified action plan to the individual (e.g., legal professional) and/or the custodians (e.g., information technology department) to handle the legal matter (non-hypothetical or non-model legal matter). As discussed above, the action plan refers to a strategy or course of action in handling the model legal matter, such as specifying the information (e.g., electronic communications exchanged between the product development group and the legal department, drawings of the exhaust system as well as the lift gate space) required to be collected, including their location (e.g., information located on a server utilized by the product development group) as well as new guidelines to be followed, such as preserving electronic communications between the product development group and the product evaluation group. By utilizing such an action plan for a most similar model legal matter, the legal matter (non-model legal matter) will be handled in a most efficient manner. A more complete capture of relevant data (e.g., required legal documents) is obtained at the lowest cost (e.g., legal cost) in connection with handling the legal matter. That is, by creating and utilizing such action plans, information to be collected for handling similar new legal matters (non-hypothetical or non-model legal matters) will be most complete. By collecting all (or nearly all) of the relevant data to handle a legal matter (non-hypothetical or non-model legal matter), costs are reduced by reducing the amount of time spent in identifying and locating the required missing information to handle the legal matter.

Alternatively, in one embodiment, legal matter analyzer 105 obtains the required information to handle the legal matter using the action plan, which specifies the required documents as well as the location of these documents to handle the legal matter. After obtaining such documents, legal matter analyzer 105 provides these documents to the appropriate individuals (e.g., legal professionals) and/or custodians.

In this manner, the technical problem experienced by corporate legal departments of not being able to ensure that the information collected for a newly created legal matter is most complete at the lowest legal and time costs is addressed by the present invention. As discussed above, the present invention provides a technological solution to the technical problem by creating action plans to handle constructed model legal matters. Such action plans are refined so that the action plans include strategies or courses of action for collecting the most complete amount of information to handle the constructed model legal matter at the lowest legal and time costs. These action plans may then be utilized for handling a real legal matter (non-model legal matter) by having users (e.g., attorneys, IT department) follow the action plan associated with the most similar model legal matter.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A legal matter analyzer, comprising:
an application specific integrated circuit customized to handle legal matters by performing the following:
analyzing a collection of current and historical records associated with legal matters to extract concepts and keywords, wherein natural language processing is utilized to identify said concepts and keywords, wherein said keywords comprise a word or words that are used to describe aspects of a legal matter, wherein said concepts comprise a general notion of a legal matter, wherein tasks performed by said legal matter analyzer using said natural language processing comprise tokenization, tagging various parts of speech, creating parse trees, syntactic analysis and semantic analysis, wherein said tokenization comprises splitting text into words and terms;
extracting metadata from said analyzed current and historical records, wherein said metadata comprises types of records and legal information, wherein said types of records comprise complaints and drawings, wherein said legal information comprises names of legal parties, claims and remedies sought;
receiving a model legal matter, wherein said model legal matter is created using said extracted metadata based on said analysis of said collection of current and historical records associated with legal matters using said extracted concepts and keywords, wherein said model legal matter is created using said extracted metadata by incorporating said legal information in said model legal matter, wherein said model legal matter comprises a hypothetical legal matter, wherein said hypothetical legal matter comprises one or more different facts of a lawsuit involving said parties, claims and remedies than in said previously handled legal matters;
creating a notice based on said model legal matter to be sent to one or more custodians to collect and return documents used in handling said model legal matter, wherein said legal matter analyzer is connected to said one or more custodians via a network, wherein said notice comprises a request to collect documents comprising electronic communications, records and drawings, wherein said legal model analyzer utilizes natural language processing to identify keywords and phrases in said model legal matter to determine which documents to be collected by said one or more custodians, wherein said documents collected by said one or more custodians is to be provided to an individual who identifies missing information from said collected documents that needs to be obtained in order to handle said model legal matter;
sending said created notice to said one or more custodians;
analyzing said documents collected by said one or more custodians, wherein said analysis comprises identifying types of documents collected, a quantity of data and a source of said documents;
analyzing said missing information from said documents collected by said one or more custodians identified by said individual, wherein said analysis comprises identifying types of information missing, a quantity of data missing and a source of said missing information, wherein said individual is a legal professional who identifies said missing information from said documents collected by said one or more custodians;
analyzing data found and not found by said one or more custodians from said identified missing information, wherein said individual requests said one or more custodians to retrieve said identified missing information, wherein said one or more custodians report back to said individual regarding said data found and not found from said identified missing information, wherein said individual prepares a cost estimation for handling said model legal matter and a remediation plan to identify data not found by said one or more custodians, wherein said cost estimation is based on an estimated number of hours spent in collecting relevant data to handle said model legal model, wherein said legal matter analyzer determines whether said data not found can be found in the future based on said remediation plan using natural language processing;
creating an action plan to handle said model legal matter based on types of data collected, a quantity of said data collected and a source of said data collected by said one or more custodians obtained from said analysis of said data collected by said one or more custodians, wherein said action plan comprises a strategy or course of action in handling said model legal matter, wherein said action plan also comprises information required to be collected, including their location, that comprises said documents collected by said one or more custodians and said data found by said one or more custodians and guidelines to be followed based on said remediation plan using natural language processing, wherein said information required to be collected comprises instructions on preserving electronic communications exchanged between designated departments, wherein said instructions on preserving electronic communications exchanged between said designated departments are based on said remediation plan prepared by an attorney which recommends preserving electronic communications exchanged between said designated departments, wherein said legal matter analyzer creates said action plan to ensure that all required information is collected to handle said model legal matter so that information to be collected for handling similar new legal matters will be complete thereby reducing costs by reducing an amount of time spent in identifying and locating missing information to handle a legal matter; and
storing said created action plan in a database, wherein said created action plan is associated with said model legal matter it is designed to handle, wherein said created action plan is associated with keywords and concepts of said model legal matter.

2. The legal matter analyzer as recited in claim 1, wherein the application specific integrated circuit is further customized to perform the following:
estimating a potential cost in handling said model legal matter based on time to collect said data and said missing information by said one or more custodians, wherein said legal matter analyzer keeps track of amount of time spent by said one or more custodians in collecting said documents, including said data found by said one or more custodians, wherein said cost estimation is further based on time spent by said individual in identifying said missing information.

3. The legal matter analyzer as recited in claim 2, wherein the application specific integrated circuit is further customized to perform the following:

continuing to refine said created action plan until said potential cost is below a threshold value by specifying different information to be collected, including their location.

4. The legal matter analyzer as recited in claim 1, wherein the application specific integrated circuit is further customized to perform the following:

receiving a description of a new legal matter;

analyzing said description to identify a previously created model legal matter with a description that is most similar to said description of said new legal matter by using natural language processing to identify keywords and concepts in said analyzed description;

comparing said identified keywords and concepts to keywords and concepts of previously created model legal matters; and identifying said previously created model legal matter in response to said description of said new legal matter containing a matching number of keywords and concepts that exceeds a user-designated threshold number.

5. The legal matter analyzer as recited in claim 4, wherein the application specific integrated circuit is further customized to perform the following:

identifying an action plan associated with said identified previously created model legal matter.

6. The legal matter analyzer as recited in claim 5, wherein the application specific integrated circuit is further customized to perform the following:

providing said identified action plan associated with said identified previously created model legal matter to an attorney to handle said new legal matter; and providing documents specified in said identified action plan to said attorney to handle said new legal matter.

7. The legal matter analyzer as recited in claim 2, wherein the application specific integrated circuit is further customized to perform the following:

continuing to refine said created action plan after a remediation plan to identify data not found is implemented by specifying different information to be collected, including their location, in response to said potential cost not being below a threshold value.

* * * * *